Figure 1:
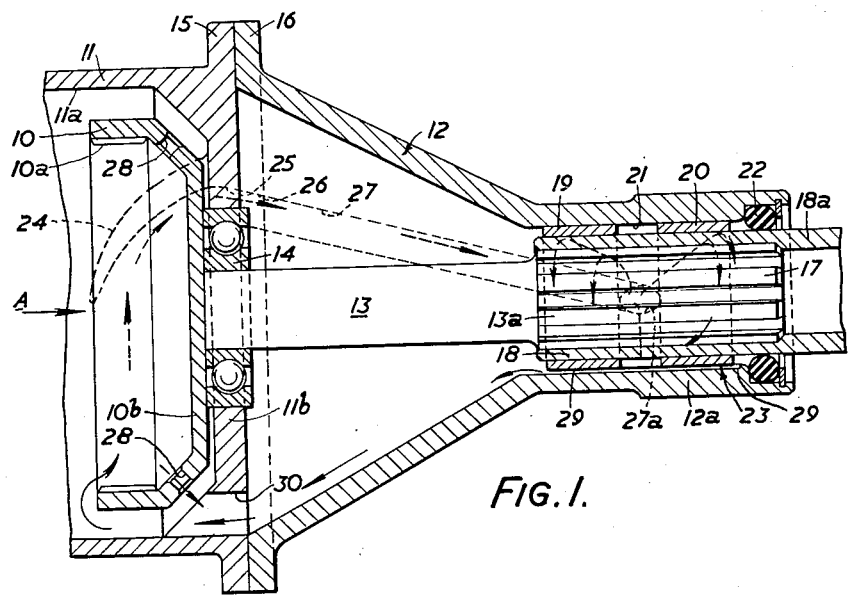

April 18, 1961 E. J. RABSON 2,980,209
CHANGE-SPEED GEARS
Filed March 26, 1958

INVENTOR
EDWARD JOHN RABSON
BY
Irvin S. Thompson
ATTORNEY

United States Patent Office 2,980,209
Patented Apr. 18, 1961

2,980,209

CHANGE-SPEED GEARS

Edward John Rabson, Birmingham, England, assignor to Hardy Spicer Limited, Birmingham, England Filed Mar. 26, 1958, Ser. No. 724,002

Claims priority, application Great Britain Apr. 1, 1957

10 Claims. (Cl. 184—11)

This invention relates to change-speed gears, for example as employed in the transmission systems of motor road vehicles, and more especially though not exclusively to that type of change-speed gear which is used to obtain an overspeed drive for the propeller shaft of the vehicle.

Ordinarily the output shaft of such change-speed gears is coupled directly to the front universal joint of the propeller shaft of the vehicle, such propeller shaft including a splined coupling, but constructions have more recently made their appearance in which the sliding splined coupling is embodied in a rear end casing of the change-speed gear itself. This latter arrangement presents the advantages of a reduced number of parts in manufacture and reduced production costs, in addition to enabling the splined coupling and its bearing to be lubricated by the existing internal oil supply of the change-speed gear.

However, with certain change-speed gears of the foregoing character, in the operation of the gear the bearing of the sliding splined coupling housed at the rear end of the rear end casing becomes starved of oil and rapidly runs hot, with resulting failure of the bearing. This lack of lubrication of the rear end bearing may be attributed to centrifuging of the oil in the casing of the gear which, coupled with the fact that the rear end casing is usually of rearwardly tapering or funnel shape, results in the oil being driven forwardly away from the splined coupling and its bearing. The main object of the present invention is to overcome this defect and to provide an improved and positive lubrication system for the change-speed gear.

According to the invention, in a change-speed gear having a casing of rearwardly tapering or funnel shape providing an output shaft bearing at its rear end, the output member of the change-speed gear is constructed to function as the impeller of a centrifugal pump the body of which is formed by the adjacent part of the casing of the change-speed gear whereby oil is delivered to the forward end of an oilway extending rearwardly and inwardly to open at its rearward end on to the rear end bearing so that oil is fed to the latter and thence returns forwardly to complete a closed circuit.

Preferably the said adjacent part of the casing of the change-speed gear is shaped to catch and deflect the oil centrifuged by the output member to the forward end of the oilway the rearward end of which opens on to the outer member of a splined coupling carried in the rear end bearing.

If desired the oilway may comprise a gallery formed in the wall of the casting which forms the rear casing of the change-speed gear. The output member of the change-speed gear is preferably formed with a plurality of angularly spaced openings providing communication from the interior to the exterior of said output member in order to facilitate the flow of oil under the rotation of said output member to the shaped part of the casing adjacent the forward end of the oilway.

When the change-speed gear comprises an epicyclic gear the internal gear or planet carrier functions as the pump impeller and also draws oil across the planet gears for delivery to the forward end of the oilway.

Figure 2:
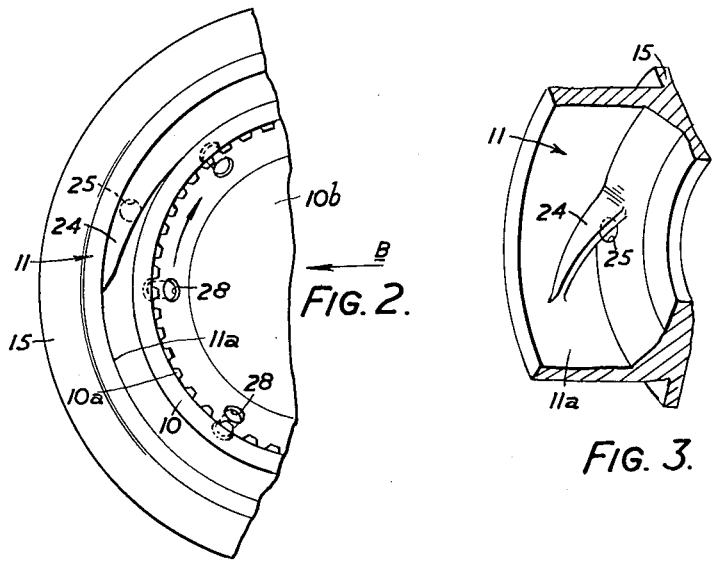
Figure 3:
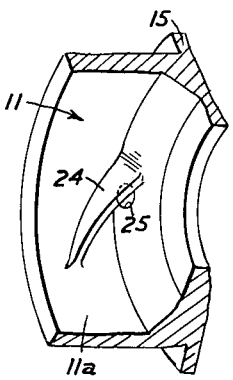

The application of the invention to change-speed gears of the so-called overdrive type for automobile transmission systems will now be described, by way of example, with reference to the accompanying drawings, in which:

Figure 1 is a broken schematic view illustrating in axial section a rear portion of the casing of the change-speed gear and the output member of the latter the shaft of which slidably carries a sleeve member at its rear end, Figure 2 is a broken view of the arrangement shown in Figure 1 looking in the direction of the arrow A in that figure, and Figure 3 is a broken perspective view of the interior of the casing looking in the direction of the arrow B of Figure 2.

Referring to the drawings, the output member 10 of the change-speed gear is arranged within a casing comprising a main casing portion 11 and a rear casing portion 12, a forward end of the output member being disposed at the rear end of the main casing portion 11. The change-speed gear comprises generally an epicyclic gear and a clutch member which may be employed to clutch the sunwheel of the epicyclic gearing to the output member 10 of the latter or the sunwheel to a stationary member alternatively at will, depending on whether overdrive or direct drive is required respectively. The overdrive gear may comprise, in addition to the epicyclic gearing, means for engaging and disengaging the clutch members of the latter, such means preferably taking the form of a hydraulic pump and control mechanism. These components of the overdrive gear, which are not illustrated as they form no part of the present invention, are arranged in the main casing portion 11 from the rear end of which the rearwardly tapering or funnel-shaped rear casing portion 12 extends. The latter receives the output shaft 13 of the output member 10 the forward portion of which comprises an internal or ring gear 10a, the output member being carried in a radial and thrust bearing 14 disposed substantially on the line of mating flanges 15, 16 of the main and rear casing portions 11, 12 respectively. These flanges 15, 16 serve to connect the main and rear casing portions 11, 12 to each other. The free or rearward end 13a of the output shaft 13 of the output member 10 is formed with external splines 17 and slidably engages within an internally splined reverse sleeve member 18 which is carried in a spaced pair of plain bearing members 19, 20 arranged in an axial bore 21 formed in the tubular rear end 12a of the rear casing portion 12. Such reverse sleeve member 18 has its rearward end 18a projecting from the rear end 12a of the rear casing portion 12 in which it is slidable and carries at such rearward end the yoke member, not illustrated, of the front universal joint of the propeller shaft of the vehicle. Escape of oil from the rear casing portion 12 along the surface of the reverse sleeve member 18 is prevented by the interposition of a sealing ring 22 of any suitable type between the rear end 12a of the rear casing portion and the sleeve member.

In order to prevent oil starvation of the journal bearing 23 formed by the spaced plain bearing members 19, 20, within which the reverse sleeve member 18 is both slidable and rotatable, by centrifuging of the oil under the rotational movement of the parts, and subsequent propulsion of the oil forwardly into the main casing portion 11, oil is force fed from the main casing portion to the journal bearing and a constant circulation of oil thereover is established and maintained. This is achieved, according to the invention, in a particularly simple manner and without increasing the already large number of parts in the gear by causing the output member to function as the impeller of a centrifugal pump. To this end the inner surface 11a of the wall of the main casing portion 11 is formed with an inwardly projecting impingement rib or deflector 24 which curves circumferentially forwards (having regard to the direction of rotation of the internal gear as shown by the arrow in Figure 2) and rearwards in the fore and aft direction of the casing. This ensures that a small body of pressure oil is always maintained immediately in front of the rear surface of the rib or deflector 24 and from this point a bore 25 is formed through the rear flange 15 of the main casing portion 11 which registers with a similar bore 26 in the mating front flange 16 of the rear casing portion 12. Thence the oil travels along a gallery 27, Figure 1, bored in the wall of the rear casing portion 12 and extending towards the rear end 12a of the latter where it opens, as shown at 27a, on to the outer surface of the reverse sleeve member 18 at a point between the axially spaced plain bearing members 19, 20 forming the journal bearing 23 of the latter, the space between the plain bearing members forming a circumferentially arranged oilway.

The rib or deflector 24 is preferably, and as illustrated, arranged in the upper half of the main casing portion 11 so that the oil gallery 27 to the rear journal bearing 23 extends rearwardly and inwardly, as will be appreciated from a consideration of Figure 1.

In order to increase the efficiency of the output member 10 as a pump impeller it is formed with a series of angularly separated holes 28 extending through its cross-section between the rear end of the internally toothed ring gear or annulus 10a and its supporting substantially radial flange or web 10b. In addition to increasing the efficiency of the pump this also produces a forced flow of oil rearwardly over the planet pinions of the epicyclic gearing and furthermore overcomes the tendency to loss of oil from the casing 11 through the oil filler, not illustrated, which is normally located at the front end of the main casing towards which the oil is normally impelled. The oil which is force fed to the journal bearing 23 of the reverse sleeve member 18 through the aperture 27a in the manner already described passes forwardly through the plain bearing member 19 and rearwardly through the plain bearing member 20, a channel 29 being formed in the cylindrical surface of the bore 21 to allow surplus oil as well as the oil that has passed through the plain bearing member 20 to return forwardly due to the natural centrifuging action which occurs under the rotation of the parts. An opening 30 is provided through the bottom of the rear wall 11b of the main casing 11 to enable the forwardly returning oil to pass from the rear casing 12 to the main casing so that the oil is kept constantly circulating along a path indicated by the arrows in Figure 1, the working temperature of the gear as a whole being substantially reduced due to this oil circulation over and away from the rear journal bearing 23 and over and through the epicyclic gearing.

I claim:

1. A change-speed gear comprising in combination a casing at least a rear portion of which is of generally rearwardly tapering shape, an output member of said gear arranged within said casing and the forward end of which during rotation acts as the impeller of a centrifugal pump the body of which is formed by a part of said casing adjacent said output member and disposed therearound, an output bearing at the narrow rear end of said casing for said output member, and a tubular gallery open only at each end and formed in the wall of said casing to provide an oilway extending from said adjacent part of the casing to said output bearing, said adjacent part of the casing being shaped to catch and deflect oil centrifuged by said forward end of the output member to the adjacent open end of said gallery the opposite end of which opens directly on to said forward end of the output bearing, said output member being formed as an internally toothed ring gear provided with a plurality of angularly spaced openings disposed in a supporting substantially radial web of the ring gear to provide communication from the interior to the exterior of said forward end of said output member in order to facilitate the flow of oil under the rotation of said output member to said shaped part of said casing.

2. A change-speed gear comprising in combination a casing at least a rear portion of which is of generally rearwardly tapering shape, an output member of said gear arranged longitudinally within said casing and which acts as the impeller of a centrifugal pump the body of which is formed by a part of said casing adjacent said output member and disposed therearound, an output bearing comprising two axially spaced bearing members mounted in an axial bore at the narrow rear end of said casing, and a tubular gallery open only at each end and formed in the wall of said casing to provide an oilway extending from said adjacent part of the casing to said output bearing, said adjacent part of the casing being shaped to catch and deflect oil centrifuged by said output member to the adjacent open end of said gallery the opposite end of which opens into said axial bore at a point between said axially spaced bearing members, the space between said axially spaced bearing members forming a circumferentially arranged oilway.

3. A change-speed gear according to claim 2 wherein a longitudinal channel is formed in the cylindrical surface of said axial bore to extend from end to end of the latter to allow surplus oil as well as the oil that has passed through the rear bearing member to return longitudinally of said casing to said adjacent part thereof.

4. A change-speed gear comprising in combination a casing at least a rear portion of which is of generally rearwardly tapering shape, an output member of said gear arranged within said casing and which acts as the impeller of a centrifugal pump the body of which is formed by a part of said casing adjacent said output member and disposed therearound, an output bearing comprising two axially spaced plain bearing members mounted in an axial bore at the rear end of said casing, a tubular gallery open only at its forward and rearward ends and formed in the wall of said casing to provide an oilway extending rearwardly and inwardly from said adjacent part of the casing to said output bearing, and an inwardly projecting impingement rib at said adjacent part of said casing to cath and deflect oil centrifuged by said output member to the adjacent open end of said gallery, said rib curving circumferentially forwards (having regard to the direction of rotation of the output member) and rearwards in the fore and aft direction of the casing so that a small body of pressure oil is always maintained immediately in front of the rear surface of said rib at which point the forward end of said gallery is disposed, the opposite end of said gallery opening into said axial bore at a point between said axially spaced bearing members, the space between said axially spaced bearing members forming a circumferentially arranged oilway and a longitudinally arranged channel being formed in the cylindrical surface of said axial bore to allow surplus oil as well as oil that has passed through the rearmost of said spaced bearing members to return forwardly in the casing to complete a closed circuit.

5. A change-speed gear according to claim 4, wherein said output member is formed with a plurality of angularly spaced openings providing communication from the interior to the exterior of said output member in order to facilitate the flow of oil under the rotation of said output member to said forward end of said gallery.

6. A change-speed gear comprising in combination a casing having a rear portion of generally rearwardly tapering shape, said gear including an output member rotatably arranged within said casing and one end of which comprises an internally toothed ring gear which acts during rotation as the impeller of a centrifugal pump the body of which is formed by a part of said casing adjacent and surrounding said ring gear a supporting web of which has a plurality of angularly spaced openings formed therein to provide communication from the interior to the exterior of said output member, an output bearing disposed coaxially with said output member at the narrow rear end of said casing, said adjacent part of the casing being shaped to catch and deflect oil centrifuged by said impeller to the adjacent end of an oilway extending rearwardly along the casing, the other end of said oilway delivering said oil directly to said output bearing and the arrangement being such that after the oil leaves said output bearing it retuns directly along the casing to said adjacent part thereof.

7. A change-speed gear according to claim 6, wherein said output member also comprises an output shaft which extends rearwardly from said ring gear into said output bearing, the rear end of said output shaft being splined and slidably engaged within an internally splined sleeve member slidably and rotatably mounted in said output bearing, oil being fed by said other end of said oilway directly on to the outer surface of said sleeve at a point above the lower surface of said output bearing when in use.

8. A change-speed gear according to claim 7, wherein said output bearing comprises two axially spaced plain bearing members mounted in an axial bore at the narrow rear end of said casing and said other end of said oilway delivers said oil to the space between said plain bearing members.

9. A change-speed gear comprising in combination a casing having a rear portion of generally rearwardly tapering shape, an internally toothed ring gear arranged within said casing, an output shaft of the gear arranged within said casing, an output bearing at the rear end of said casing for said output shaft, and a tubular gallery open at each end and formed in the wall of said casing to provide an oilway extending to said output bearing, said ring gear having a supporting web formed with a plurality of angularly spaced openings arranged so that during rotation of the ring gear oil is centrifuged through said openings and an adjacent part of the casing being arranged to catch and deflect oil so centrifuged to the open forward end of said tubular gallery.

10. A change-speed gear according to claim 9, wherein said ring gear is an output gear and forms a common output member with said output shaft.

References Cited in the file of this patent

UNITED STATES PATENTS

| | | |
|---|---|---|
| 2,240,118 | Matthews | Apr. 29, 1941 |
| 2,368,963 | Boden | Feb. 6, 1945 |
| 2,654,441 | Orr et al. | Oct. 6, 1953 |
| 2,690,248 | McDowall | Sept. 28, 1954 |